Dec. 29, 1953 G. H. ALLGEYER 2,664,490
BROILER GRIDDLE MOUNTING MEANS
Filed Dec. 29, 1949 2 Sheets-Sheet 1
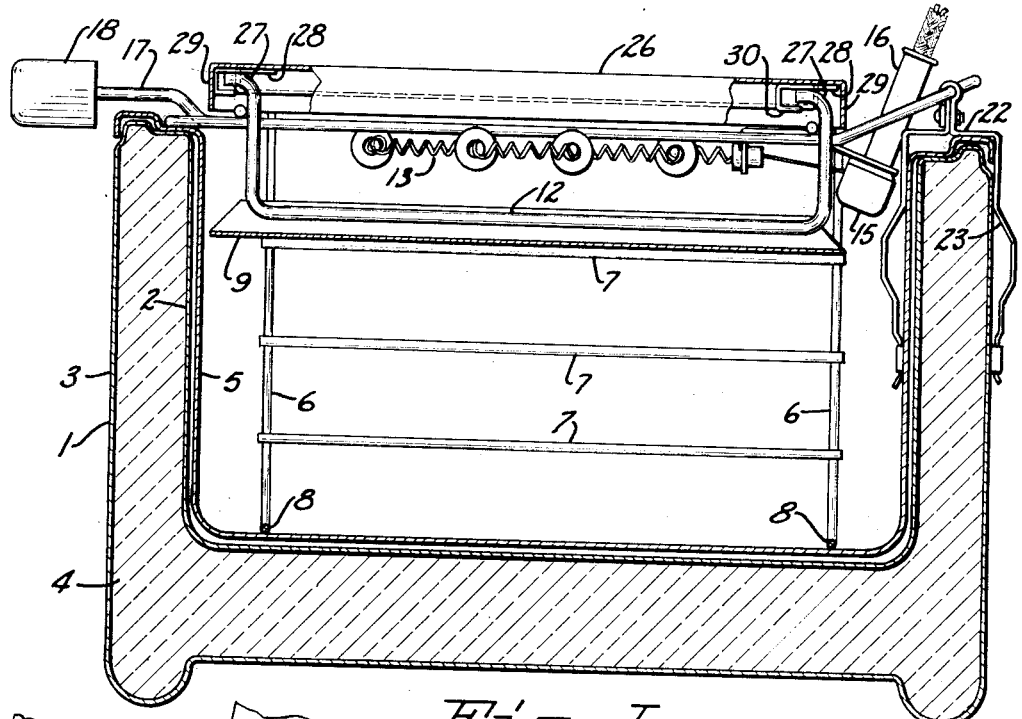
Fig. I
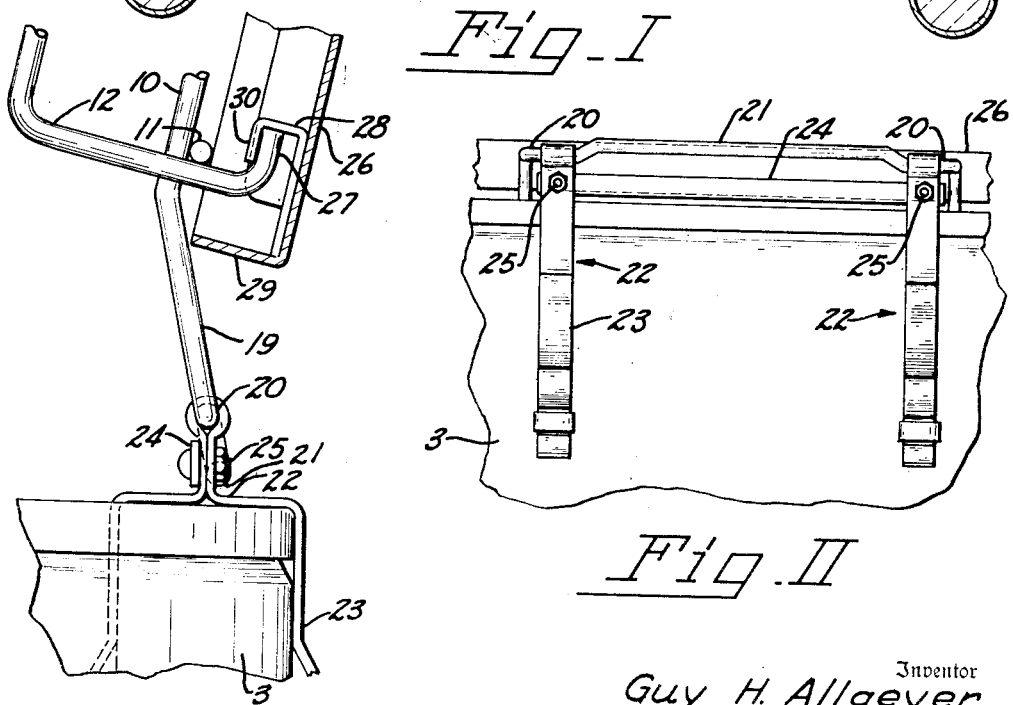
Fig. II
Fig. III
Inventor
Guy H. Allgeyer
Marshall, Marshall & Leonard
Attorneys Dec. 29, 1953 G. H. ALLGEYER 2,664,490
BROILER GRIDDLE MOUNTING MEANS
Filed Dec. 29, 1949 2 Sheets-Sheet 2
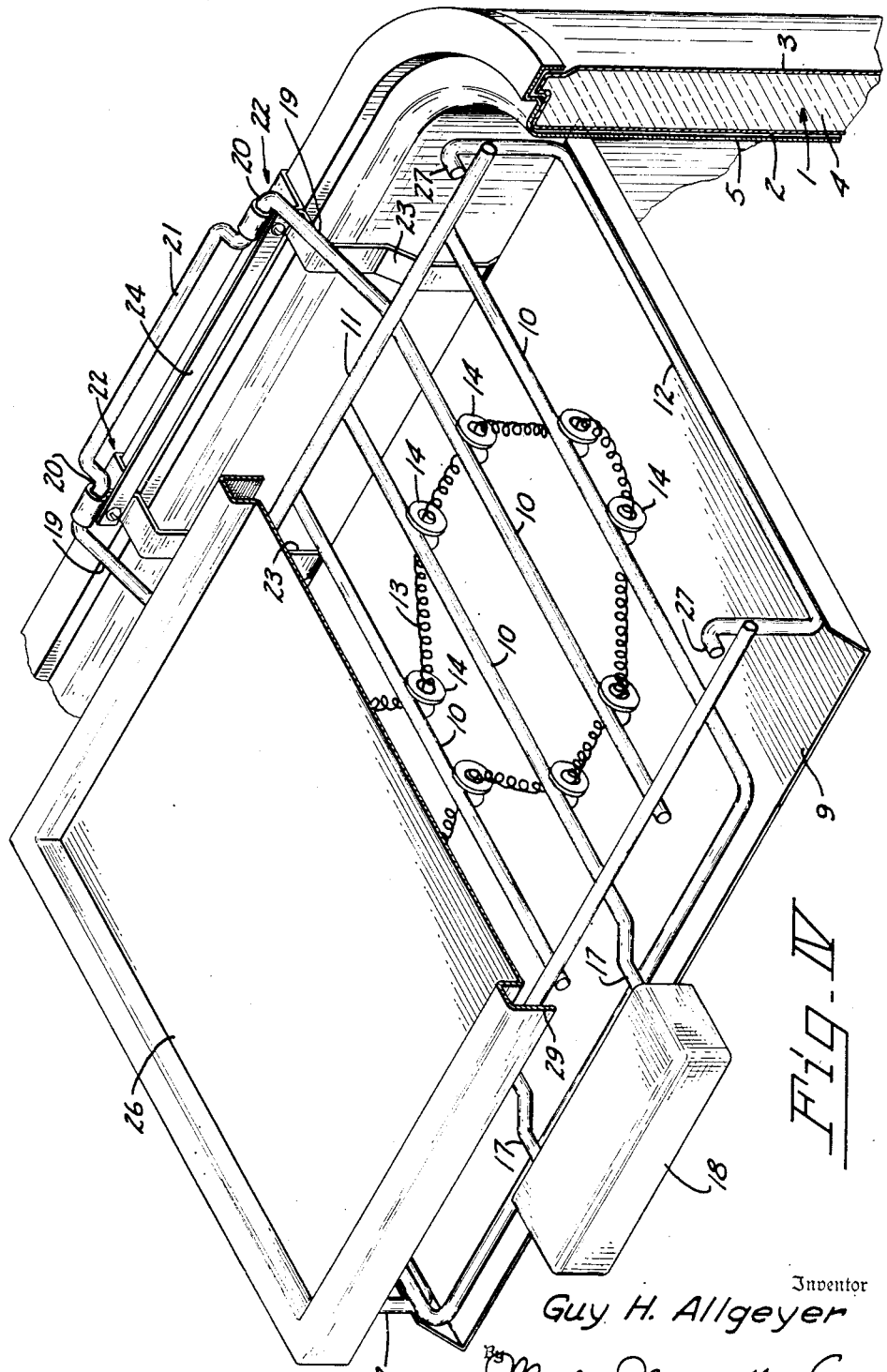
Fig. IV
Inventor
Guy H. Allgeyer
By Marshall, Marshall & Leonard
Attorneys Patented Dec. 29, 1953

2,664,490

UNITED STATES PATENT OFFICE 2,664,490

BROILER GRIDDLE MOUNTING MEANS

Guy H. Allgeyer, Toledo, Ohio, assignor, by mesne assignments, to Tropic-Aire, Inc., Chicago, Ill., a corporation Application December 29, 1949, Serial No. 135,810

3 Claims. (Cl. 219—35)

This invention relates to electric food broilers for use in domestic food roasters and more particularly to a combination griddle and frying pan for use on such an electric food broiler and to improvements in the means for mounting the griddle on the broiler so that it can be quickly and easily removed therefrom when desired and retained thereon during normal operation.

Figure I of the drawings is a vertical sectional view of a domestic type electric food roaster provided with an electric food broiler embodying the invention.

Figure II is a fragmentary view in elevation from the rear of the roaster, or the right side of Figure I and illustrating the construction of the broiler mounting means.

Figure III is an enlarged fragmentary view in elevation of a portion of the roaster and broiler shown in Figure I and illustrating this mechanism in its elevated or inoperative position.

Figure IV is a fragmentary isometric view of the broiler mechanism illustrating its general construction and its mounting on the wall of a domestic type food roaster.

A domestic food roaster of the type with which a broiler embodying the invention is designed to be used consists in an upwardly open hollow body 1, having an inner shell 2 and an outer shell 3 between which is located heat insulating material 4 and heating coils (not shown). An insert pan 5 which closely fits the inner shell 2 is removably located within the roaster, serving to hold food or other containers for food which is to be cooked in the roaster.

Because of the hollow, well-shaped construction of the roaster body, it is well adapted for use as a food holder when food is to be broiled as well as for use in actually cooking food. When food is to be broiled and the roaster is to be used merely as a container and as a pan for catching the juices, etc., dripping from the food, or as a reflector for the heat generated by the broiler, the roaster may be equipped with a rack 6 which consists in a plurality of spaced horizontal, parallel bars 7, a set of which is located at each end of the roaster and connected to each other by longitudinally extending tie bars 8. The bars 7 serve to support a pan 9 or may be used to support an open wire grill (not shown) on either of which food to be broiled may be placed.

A broiler attachment for use in broiling food may consist in a wire framework comprising a plurality of heating element mounting wires 10 (Figure IV), transverse frame wires 11 and cross frame wires 12. In the broiler illustrated in the drawings, a single coil heating element 13 is supported by means of insulators 14 which may be made of ceramic or other non-conducting material. The insulators 14 are mounted on the mounting wires 10 in such position as to spread the element 13 generally over the entire area of the roaster. The element 13 is connected to a utility plug 15 (Figure I) which may receive a utility power lead 16. In the broiler shown in the drawings two of the element mounting wires 10 are carried forwardly and bent upwardly having extensions 17 on the front end of which is secured a handle 18. The pair of element mounting wires 10 (in reality, one wire) extend rearwardly having upwardly inclined parallel sections 19 which have inwardly turned coaxial hinge portions 20 and a rearwardly spaced parallel stop portion 21. The hinge portions 20 are each grasped in one of a pair of formed metal clips 22 which encircle the hinge portions 20 and have downwardly extending spaced resilient legs 23. The legs 23 are so shaped and of such size as to resiliently slide embracingly over the rear wall of the roaster body and over the inner wall of the pan 5 as is best illustrated in Figure I thus serving as a removable mounting means for the broiler. The two clips 22 are horizontally spaced from each other by a thin metal tie bar 24 which is secured to the clips 22 by means of a pair of small bolts 25 also serving to clamp the encircling section of the clips 22 around the hinge portions 20 of the mounting wires 10.

The clips 22 serve as hinge and support means for the broiler, supporting the broiler when in the operating position shown in Figures I and IV and permitting it to be swung upwardly to the position illustrated in Figure III. This provision which allows the broiler to be swung upwardly is necessary to permit the cook to examine the food being broiled without the necessity for lifting the broiler manually and resting it on some other object and the consequent danger of burning either the cook or the other object, inasmuch as the heating element 13 reaches a high temperature. When the broiler is swung upwardly into the position illustrated in Figure III, the stop portion 21 engages the rear upper edge of the tie bar 24 to limit the travel of the broiler. This engagement takes place when the broiler has passed slightly beyond its uppermost position so that the force of gravity holds the broiler in the position illustrated in Figure III without danger of its falling forwardly and down on the hands of a cook testing or removing food being broiled.

The cross frame wires 12 are U shaped with their horizontal portion located at a level below the insulators 14 and heating element 13 so that the broiler as a whole can be placed on a table or other flat surface when not in use.

Inasmuch as the broiler is equipped with a radiant heating element 13 means must be provided to reflect heat downwardly onto the food being broiled and, since the reflector plate would, of course, be heated, it is designed so that it can be used as a griddle as well. Thus in the broiler embodying the invention, the reflector is made in the form of a griddle 26 for frying or grilling foods. In many prior art broiler attachments for domestic food roasters the reflector-griddle serves as a structural element for the broiler and the heating wires are connected to it. This is disadvantageous in that some disassembly of the device is necessary in order to remove the reflector-griddle so that it can be washed without wetting the heating element wires which shortly ruins them.

In the broiler embodying the invention, provision is made for very simple and rapid removal of the reflector-griddle without the necessity for any disassembly or laborious disengagement of holders or clips which retain it on the broiler frame during normal operation. This simple disengageable means consists in turned over fingers 27 formed on the upper ends of the vertically extending portions of the U-shaped cross frame wire 12 and located one at each of the four corners of the broiler. The fingers 27 are turned forwardly (i. e., away from the side of the broiler at which it is hinged), those on each side being coaxial and all four being parallel. Cooperating with the fingers 27 are four L-shaped metal clips 28 which are secured to the under surface of the reflector-griddle 26 and spaced from each other identically with the spacing of the fingers 27. The two clips 28 located at the front of the reflector-griddle 26 are adjacent its forward downwardly turned rim 29 whereas the two clips 28 at the rear of the griddle 26 are spaced forwardly slightly from the downwardly turned lip 29 a distance sufficient to permit the rear fingers 27 to be inserted upwardly between the lip 29 and a rearwardly turned horizontal portion 30 of the clips 28. When the broiler is in the position illustrated in Figures I and IV the reflector-griddle 26 can be removed by sliding it forwardly until the vertical portions of the cross frame wires 12 strike the inner surface fo the lip 29 at the rear of the reflector-griddle 26. The reflector-griddle 26 can then be lifted vertically and is completely disengaged from the broiler frame. When the reflector-griddle is to be replaced it is merely dropped vertically into place. When the broiler is swung upwardly into the position illustrated in Figure III, gravity causes the reflector-griddle 26 to slide downwardly and rearwardly, moving the portions 30 of the clips 28 beneath the fingers 27 and retaining it on the broiler frame.

Were the reflector-griddle merely a griddle it would not have to remain on the broiler when the broiler is swung up to the position shown in Figure III and were it merely a reflector it might not have to be easily removable to permit washing. However, since it is both a reflector and griddle, the instant invention takes into consideration the two conflicting desiderata and the reflector-griddle embodying the invention remains in reflecting position during broiling and when the broiler is swung upwardly to permit inspection of the food being broiled without its being mechanically secured to the broiler by means requiring any dis-assembly in order to permit its removal for washing.

The invention comprises means for accomplishing this result as set forth in the claims below.

Having described the invention, I claim:

1. In a food broiling and frying attachment having a generally-rectangular, open, wire frame, a heating unit carried by said frame and hinge means for mounting said attachment for movement between a generally-horizontal cooking position overlying a food supporting and containing body, and a generally-vertical position not overlying said body, said attachment having also a generally-flat, combination griddle-and-reflector adapted to overly said heating unit when said attachment is in cooking position, the improvement that consists in a quickly-detachable means for mounting said griddle-and-reflector on said frame, said mounting means comprising wires on said frame extending perpendicular to the plane of said griddle-and-reflector and having terminal bent-over hook portions extending away from said hinge means and substantially parallel to the plane of the griddle-and-reflector, cooperating socket portions on said griddle-and-reflector for receiving said wires and shoulder members in said sockets for catching said bent-over hook portions, said frame leaving said griddle-and-reflector sufficiently unobstructed that it can move on said frame toward and away from said hinge means for hooking and unhooking said parts.

2. In a food broiling and frying attachment having a generally-rectangular, open, wire frame, a heating unit carried by said frame and hinge means for mounting said attachment for movement between a generally-horizontal cooking position overlying a food supporting and containing body, and a generally-vertical position not overlying said body, said attachment having also a generally-flat reflector adapted to overly said heating unit when said attachment is in cooking position, the improvement that consists in a quickly-detachable means for mounting said reflector on said frame, said mounting means comprising hook elements on said frame, each said hook element extending up from the frame in the cooking position thereof and away from said hinge means, and cooperating parts on said reflector for engaging said hook elements, said cooperating parts providing shoulder portions that fit under said hook elements for holding said reflector against motion upward from the cooking position and hingeward, and providing also shoulders for limiting movement of said reflector in the two directions of the hinged axis, said frame leaving said reflector sufficiently unobstructed that it can move on said frame toward and away from said hinge means for hooking and unhooking said parts.

3. In a food broiling and frying attachment having a generally-rectangular, open, wire frame, a heating unit carried by said frame and hinge means for mounting said attachment for movement between a generally-horizontal cooking position overlying a food supporting and containing body, and a generally-vertical position not overlying said body, said attachment having also a generally-flat reflector adapted to overly said heating unit when said attachment is in cooking position, the improvement that consists in a quickly-detachable means for mounting said reflector on said frame, said mounting means comprising wires on said frame extending up from the cooking position and substantially perpendicular to the plane of said reflector and having terminal bent-over hook portions extending away from said hinge means and substantially parallel to the plane of said reflector, and cooperating parts on said reflector for engaging said hook elements, said cooperating parts providing shoulder portions that fit under said hook elements for holding said reflector against motion upward from the cooking position and hingeward, and providing also shoulders for limiting movement of said reflector in the two directions of the hinge axis, said frame leaving said reflector sufficiently unobstructed that it can move on said frame toward and away from said hinge means for hooking and unhooking said parts.

GUY H. ALLGEYER.

References Cited in the file of this patent

UNITED STATES PATENTS

| Number | Name | Date |
|---|---|---|
| 1,179,986 | Warner | Apr. 18, 1916 |
| 1,542,867 | Fisher | June 23, 1925 |
| 1,609,317 | Smith | Dec. 7, 1926 |
| 1,612,468 | Reichold | Dec. 28, 1926 |
| 2,011,848 | Chambers | Aug. 20, 1935 |
| 2,235,886 | Kahn | Mar. 25, 1941 |
| 2,242,328 | Russell et al. | May 20, 1941 |
| 2,266,100 | Uhlrig | Dec. 16, 1941 |
| 2,266,101 | Uhlrig | Dec. 16, 1941 |
| 2,313,968 | Reich | Mar. 16, 1943 |
| 2,523,796 | Weeks | Sept. 26, 1950 |